Oct. 24, 1972 M. F. SYMONIAK ET AL 3,700,589
ISOPARAFFIN-n-PARAFFIN SEPARATION PROCESS
Filed Sept. 14, 1970
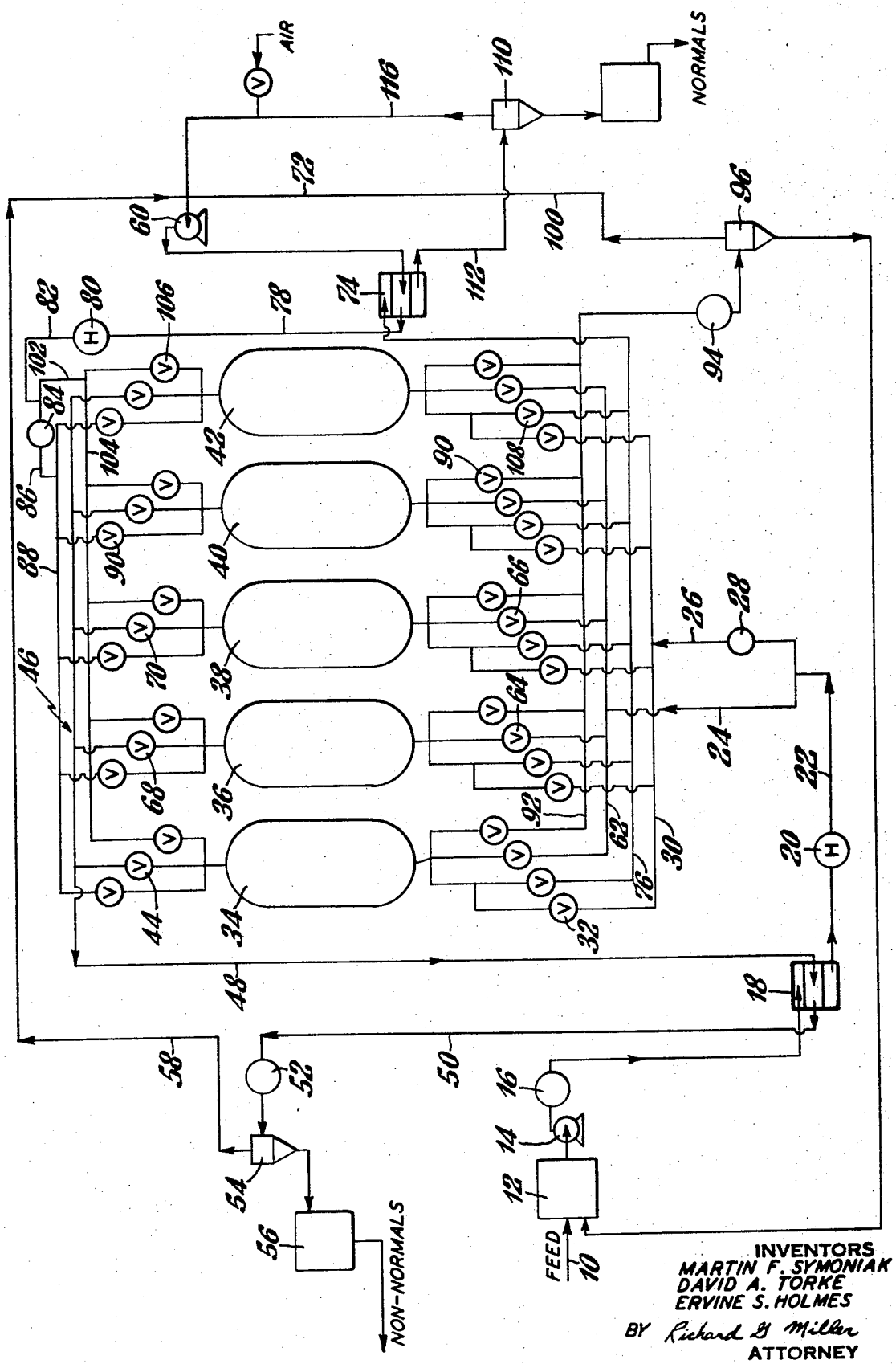
INVENTORS
MARTIN F. SYMONIAK
DAVID A. TORKE
ERVINE S. HOLMES
BY Richard G. Miller
ATTORNEY United States Patent Office 3,700,589
Patented Oct. 24, 1972

3,700,589
ISOPARAFFIN-n-PARAFFIN SEPARATION
PROCESS
Martin Francis Symoniak, Mahopac, N.Y., David Allen Torke, Dusseldorf, Germany, and Ervine Stout Holmes, Yorktown Heights, N.Y., assignors to Union Carbide Corporation, New York, N.Y.
Filed Sept. 14, 1970, Ser. No. 71,895
Int. Cl. C10g 25/04
U.S. Cl. 208—310                    6 Claims

ABSTRACT OF THE DISCLOSURE

Normal paraffins are separated from admixture with non-normal paraffins in the vapor phase at super-atmospheric pressure using a fixed adsorption bed containing a 5-A. zeolitic molecular sieve adsorbent. High purity normals are obtained if the adsorption stroke is continued until the stoichiometric point of the normals mass transfer zone has traversed to between 85 and 97 percent of the bed length and thereafter two countercurrent purge stages using a non-sorbable permanent gas are employed, the first being only sufficient to flush the vapors from the bed void space.

---

The separation of mixtures of chemical compounds into two or more fractions based on molecular size has become a conventional process since a variety of synthetic zeolitic molecular sieves have been made commercially available. The uniformity of diameter of the pores of a given zeolite molecular sieve species and the variety of pore diameters ranging from about 3 to about 11 angstroms among the various zeolite species have permitted bulk separations of the components of petroleum derived feedstocks to be made where formerly such separations by fractional distillation were economically unattractive.

Many processes for molecular sieve separation of non-straight chain hydrocarbons from straight chain hydrocarbons have been proposed and some have been successfully commercialized. Most have been based on contacting the mixed hydrocarbon feed in the vapor phase with a 5-A. molecular sieve to adsorb the straight chain hydrocarbon compounds followed by desorption of the straight chain compounds at a lower pressure or higher temperature usually with the aid of a purge gas. Some have been done with little or no change in temperature or pressure by employing a purge which is sufficiently strongly adsorbed to exert a displacing action on the adsorbed straight chain compounds. Conducting the process isothermally and isobaricly with an essentially non-sorbable, non-condensible purge gas to effect desorption has not heretofore been proposed.

It has now been found that a selective adsorption process for separating normal paraffins from branched chain or cyclic paraffins which is isobaric and isothermal and utilizes a non-sorbable purge gas is both practical and advantageous. The advantages include the capability of obtaining a very high purity straight chain hydrocarbon product and a high yield of the pure product.

In accordance with the process of the present invention, normal paraffins are separated from admixture with non-normal paraffins by passing the mixture in the vapor phase at superatmospheric pressure through a fixed bed of a zeolitic molecular sieve adsorbent having an effective pore diameter of substantially 5 angstroms until the stoichiometric point of the adsorbing normals mass transfer zone has passed between about 85 and 97 percent of the length of the bed, thereafter passing countercurrently through the bed a quantity of non-sorbable purge gas at the temperature and pressure conditions employed for the adsorption stroke sufficient to remove the bed void space vapors but not more than that which produces about 20 mole percent, preferably not more than 10 mole percent of the feed normals in the bed effluent, and thereafter countercurrently continuing the flow of nonsorbable purge gas through the bed at substantially the same temperature and pressure to desorb at least a major proportion of the normal paraffins from the adsorbent and flush same from the bed for recovery. The cycle is then repeated, beginning with the introduction of more normal-branched chain hydrocarbon mixed feed stream into the bed at the same temperature and pressure as the first adsorption stroke. Optionally and preferably the feed for the adsorption stroke of any cycle in which the feed displaces the non-sorbable desorbent gas be heated to bed temperature by heat exchange directly or indirectly with the said displaced desorbent.

The molecular sieve adsorbent can be any of the naturally occurring or syntheticaly-produced, three-dimensional crystalline zeolitic aluminosilicates from which the water of hydration can be removed without collapse of the crystal lattice and which will selectively, on the basis of molecular size, adsorb normal paraffins from the mixture thereof with branched chain and/or cyclic paraffins which comprises the feed stream. Since normal paraffins have a minimum cross-sectional diameter of about 5 angstroms, molecular sieves having pore diameters of about 5 angstroms are preferred for the practice of the present process. Especially suitable are the cation forms of zeolite A which have pore diameters of about 5 angstroms. Zeolite A is well known in the art as a synthetized zeolite having a very large adsorption capacity and, depending on the cation species present, exhibits apparent pore diameters ranging from about 3 to about 11 angstroms. As prepared in the sodium cation form, zeolite A has pore diameters of about 4 angstroms. When 25 percent, preferably at least 40 percent, of the sodium cations are exchanged by calcium and/or magnesium cations, the effective pore diameter increases to about 5 angstroms. Zeolite A as used herein in the specification and claims is intended to denote the zeolite decribed and defined in U.S. Pat. 2,882,-243. Other zeolitic molecular sieves which, in appropriate cation forms, have pore diameters of about 5 angstroms and which, although having less adorption capacity than zeolite A, are suitably employed include zeolite T, U.S. Pat. 2,950,952 and the minerals chabazite and erionite.

The hydrocarbon streams treated in accordance with the present invention consist essentially of mixtures of branched chain paraffins and normal paraffins boiling in the gasoline and kerosene ranges. Such mixtures occur as petroleum naphthas, both light and heavy, natural gasolines and natural gas condensates, but can be the products of processes outside the petroleum production and refining industry. In general, the hydrocarbons of these streams contain from about 4 to about 13 carbon atoms and preferably are substantially free of oefinically and acetylenically unsaturated species. It is also advantageous that sulfur compound impurities, if present, be present in a concentration less than about 400 parts per million, and the $H_2O$ impurity levels be below saturations. Although the process is operable regardless of the relative molar proportions of normals to non-normals present in the feed, the greatest benefit is afforded when the process is operated as one of bulk separation wherein both non-paraffins and normal paraffins each constitute at least 10 mole percent of the feedstock.

The entire process is operated at a substantially uniform temperature selected from the range of about 350° F. to 750° F. At temperatures below about 350° F., the efficiency of the non-sorbable purge gas is decreased to the point where undesirably large quantities are required adequately to purge the normals from the bed. Above about 750° F., the rate of coke deposition increases rapidly and the need for more frequent oxidative regenerations of the adsorbent arises. It is to be understood that the denomination of the present process as being "isothermal" is done so for the reason that the temperature of the feed and purge gas stream are essentially the same, i.e., within about 30° F. when entering the bed. In this, as in any adsorption-desorption cycle, it is possible for thermal gradients to develop in the bed due to heats of adsorption and desorption.

The pressure range suitable for the present process is not critical with respect to its lower limit, but is critical with respect to its upper limit. Since the process is carried out with the fluid streams being in the vapor state, atmospheric or even subatmospheric pressures are helpful in this regard. Any advantage arising from low process pressures is, however, more than balanced by the disadvantage of the necessity for the installation, maintenance and operation of vacuum equipment to accomplish fluid flow through the system. Accordingly, it is advantageous that the pressure be at least greater than atmospheric, with at least about 20 p.s.i.a. being preferred. The upper limit of pressure is dependent upon the temperature of the system and the composition of the feed. It is important that none of the feed stream components condense in the void space of the bed since such liquid phase material cannot be removed by the limited quantity of non-sorbable purge gas allotted for this purpose. Accordingly, the pressure is to be maintained at less than 80 percent of the critical pressure of the highest boiling key component of the feed or less than about 60 percent of the dew point pressure of the feed at the process temperature, whichever is the lower value. Similarly, as in the case of the term "isothermal" supra, the process is termed "isobaric" because the pressure of the adsorber feed and purge gas streams are within conventional limits the same at their respective influent ends of the bed. The term "isobaric" is thus used in its accepted sense in the art to indicate that the present process does not utilize a pressure swing type of desorption. By the term "key component" used herein in conjunction with the delineation of pressure requirements is meant any paraffinic constituent of the feed mixture which is present in significant amount. As is well understood in the art, what constitutes a significant quantity of a particular component of a mixture depends somewhat on the other components present and the nature of the treatment the feed is undergoing. Generally, however, in the present process, a key component will be present in an amount of about 10 mole precent or greater.

When the pressure conditions are dictated by the dew point criterion, the dew point of the hydrocarbon mixture involved can be determined by the procedure set forth in "Process Heat Transfer," Kern, Donald Q., McGraw-Hill Book Company, New York, N.Y. (U.S.A.), at pages 319 to 325 inclusive. Other procedures are well known in the art to make these calculations. Routine experimentation can of course be resorted to instead of calculating the dew point.

The non-sorbable purge gas used to flush the bed void space vapors and carry from the bed desorbed normal paraffins in this process is any permanent gas or mixture of such gases which have molecular dimensions sufficiently small to enter the intracrystalline cavities of the molecular sieve, but are not themselves strongly enough adsorbed to displace the normal hydrocarbons adsorbed thereon to any significant degree. Nitrogen, hydrogen, helium and methane are such materials and are preferred in the practice of this invention. Other permanent gases are kown in the art, but lack of commercial availability at reasonable cost renders them impractical although operable.

Bed void space for purposes of this invention is intended to mean any space in the bed not occupied by solid material except the intracrystalline cavities of the zeolite crystals. The pores within any binder material which may be used to form agglomerates of the zeolite crystals is considered to be bed void space.

As stated hereinbefore, the adsorption stroke wherein the normal paraffins are selectively adsorbed on the bed is continued for a period such that the stoichiometric point of the normal hydrocarbons mass transfer zone has moved through between 85 and 97 percent of the bed length. The term mass transfer zone as used herein has the same meaning as is generally accepted in the art, i.e., it denotes that section of the adsorbent bed in which the adsorbate loading of the adsorbent bed and the concentration of the adsorbate fraction in the fluid stream are both increasing with time. The "stoichiometric point" lies within the mass transfer zone and is that point at which the expended capacity of the leading section of the mass transfer zone is equal to the unexpended capacity of the transfer zone.

The process of this invention, in terms of a single bed operation, thus comprises a three step cycle wherein the first step (a) is the introduction of feedstock into the bed to selectively adsorb normal paraffins; the second step (b) is the intermediate purge with a small amount of non-sorbable purge gas to flush the vapor from the bed void space; and the third step (c) is the desorption purge wherein the high purity normal paraffins are desorbed and flushed from the bed using the non-sorbable purge gas. Advantageously, step (a) is divided into two parts wherein (assuming a steady state system in which the bed at the time of the adsorption stroke is filled with non-sorbable purge gas) the feed gas initially entering the bed on the adsorption stroke is controlled with respect to flow rate such that only sufficient feed is used to slowly replace the purge gas left in the bed void space so that the hot purge gas effluent can be efficiently heat-exchanged with the feedstock. If the full feed rate were used for this purpose, this "slug" of purge gas would exit at a high rate for only a short overall flushing period; resulting in an unsteady flow condition in the heat exchange system and requiring very large recovery equipment. In the second stage of the adsorption stroke, the feed flow rate is increased to utilize the bed capacity more efficiently with respect to time.

In order to optimize this four step cycle and to give a substantially constant flow of both normals and non-normals hydrocarbon product streams, five adsorber beds can be integrated in a time controlled sequence. This system provides optimum conditions for heat exchange and purge gas recovery, as well as favorable mass transfer and pressure drop characteristics during the adsorption step. All process valves can be automatically controlled from a timer control system. For purposes of illustrating the invention, the following description is provided in conjunction with the drawing which is a flow diagram of such a four cycle process using a five adsorbent bed system. For purposes of the exemplification, it is presumed that the system has already attained a steady state. The temperature of all primary adsorption beds and all feed streams to and effluents therefrom is 700° F. The beds are under a pressure of 100 p.s.i.a. The composition of the feed is shown in tabular form below:

TABLE 1

| Saturated hydrocarbon component | Non-rounds, wt.-percent of component in feed | Wt.-percent normal paraffin in feed |
|---|---|---|
| $C_7$-$C_5$ | | |
| $C_6$ | | Trace |
| $C_7$ | 2.38 | 2.00 |
| $C_8$ | 22.63 | 5.45 |
| $C_9$ | 30.34 | 6.42 |
| $C_{10}$ | 21.32 | 3.11 |
| $C_{11}$ | 5.37 | 0.40 |
| $C_{12}$ | 0.53 | Trace |
| $C_{13}$ | Trace | Trace |

With reference to the drawing, the feed stream is fed through line 10 to accumulator tank 12 from which it is drawn by pump 14 through a feed rate controller 16 and thereafter through heat exchanger 18 where it is heated to about 450–500° F. by heat exchange with hot purge gas from an adsorption bed undergoing first stage adsorption. The partially heated feed stream is raised to full 700° F. operating conditions in a gas fired heater 20. The flow rate of the feed stream from heater 20 into line 22 is 220,358 pounds per hour and, because of admixture of the original feed with recycle material in accumulator 12, has a normal paraffin content of about 18.5 wt. percent. The stream from line 22 is directed partially to line 24 and partially to line 26 by means of flow rate controller 28 in line 26. Through line 26 the minor portion of the feed from line 22, namely 34,936 pounds per hour, is directed through manifold 30 and valve 32 to adsorption bed 34. Each of the five adsorption beds in the system, namely beds 34, 36, 38, 40 and 42 contain 67,342 pounds of calcium zeolite A in the form of 1/16 inch cylindrical pellets. Each bed is 12.5 feet long and 12 feet in diameter. Bed 34, at the time the feed passing through valve 32 enters, contains residual nitrogen purge gas from the preceding desorption stroke. The rate of flow of the feed through line 26, manifold 30 and valve 32 is controlled such that bed 34 is flushed of residual nitrogen uniformly over a period of about two minutes, i.e., the effluent from bed 34 exits at a rate of about 6,379 pounds per hour. During this first stage of the adsorption stroke in bed 34, the nitrogen effluent passes from the bed through valve 44 into manifold 46 and is directed through line 48 to heat exchanger 18. Also flowing through manifold 46 and line 48 are non-normal fractions of the feed which are passing through beds 36 and 38 which are in second stage adsorption operation. Accordingly, the gas leaving heat exchanger 18 is a mixture of nitrogen and non-normal hydrocarbons. This mixture passes through line 50 to water cooler 52 and separator 54. The condensed non-normal hydrocarbons are passed from separator 54 to accumulator 56. The nitrogen purge gas leaves separator 54 through line 58 to purge recycle compressor 60. During the two minute period immediately prior to the two minute period in which residual nitrogen purge gas is being flushed from bed 34, the residual nitrogen was similarly being flushed from bed 36 and bed 38 was operating in the first two minutes of a four minute second adsorption stage. Thus, during the two minute period when the nitrogen was being flushed from bed 34, feed from line 24 through manifold 62, and valve 64 and 66 to beds 36 and 38 respectively at the rate of 92,711 pounds per hour. The normal paraffins in the feed are adsorbed by each of beds 36 and 38 at the rate of 15,822 pounds per hour and the non-adsorbed non-normals emerge from the beds through valves 68 and 70 respectively at the rate of 76,889 pounds per hour and are fed to manifold 46. Along with the nitrogen being flushed from bed 34, the non-normals flow through line 48, heat exchanger 18, line 50, water cooler 52, separator 54 and the condensed product accumulated in accumulator 56. During the two minute period when the residual nitrogen is being flushed from bed 34, bed 40 is undergoing the first stage of purging with nitrogen wherein the hydrocarbons in the bed void space is being flushed from the bed. During the same two minute interval, bed 42, which underwent the first stage purging during the previous two minute interval, is undergoing the second stage of desorption in which the normal hydrocarbons are desorbed from the molecular sieve adsorbent and removed from the bed. The nitrogen purge gas streams used in these two desorption stages have a common source, purge recycle compressor 60. From compressor 60, the nitrogen gas stream is passed through line 72 and through heat exchanger 74 wherein it is heated to about 550–600° F. by the heat-from hot desorbed normals from any of the adsorption beds flowing through manifold 76. From the heat exchanger 74 the nitrogen gas stream passes through line 78 to gas fired heater 80 where it is heated to 700° F. and thence through line 82. By means of flow controller 84 the gas flow from line 82 is divided into two streams, the lesser stream being passed at the rate of 6,986 pounds per hour through line 86, manifold 88, and valve 90 countercurrently (with respect to the previous adsorption stroke) through bed 40. The low controlled flow rate employed for the two minute first stage desorption is for the purpose of flushing non-adsorbed hydrocarbon in the bed void spaces without causing desorption of the normals from the adsorbent. The effluent from bed 40, consisting of 32,952 pounds per hour hydrocarbon and 607 pounds per hour nitrogen, passes through cooler 94 and separator 96. The condensed hydrocarbons from separator 96 are fed through line 98 to accumulator tank 12 where it is mixed with new feedstock for reprocessing. The nitrogen is taken from the top of the separator and directed through line 100 to purge recycle compressor 60. The major portion of the nitrogen stream from line 82, namely 127,362 pounds per hour, is passed through line 102 to manifold 104 and thence through valve 106 through bed 42 for a two minute period which is the second state desorption operation. During this period, the selectively adsorbed normal paraffins are desorbed from the zeolitic molecular sieve and flushed from the bed for recovery at a purity level greater than 99%. The effluent from bed 42, consisting of 33,000 pounds per hour normal paraffins and 127,362 pounds per hour nitrogen are fed through valve 108 to manifold 76 and thereafter through heat exchanger 74. The cooled normal paraffins and nitrogen leaving heat exchanger 74 are fed to separator 110 through line 112 wherein the normals are fed to normals accumulator 114 and the nitrogen recycled to purge recycle compressor 60 through line 116.

The foregoing description is for a single two minute period of a ten minute cycle of the system. For the next two minute period, appropriate valves are operated so that bed 34 begins a second stage adsorption stroke, bed 36 remains on second stage adsorption, bed 38 begins a first stage desorption, bed 40 enters a second stage desorption and bed 42 begins a first stage adsorption stroke. Similarly, a new cycle begins. After each two minute period and at the end of a ten minute period, the beds have all gone through all stages of adsorption and desorption. The following chart indicates the functioning of each of the five beds for each two minute period. In the chart, A–1 denotes the first stage adsorption in which a bed is flushed of residual nitrogen using a feedstock stream at low feed rates. A–2 denotes a conventional adsorption stroke, i.e., the second stage adsorption herein, in which the rate of feed of the hydrocarbon mixture is commensurate with efficient use of the bed. DP–1 denotes a first stage desorption in which nitrogen purge gas is used in an amount sufficient only to remove hydrocarbon vapor from the bed void spaces, and DP–2 denotes second stage, i.e., nitrogen purge using flow rates sufficient to desorb normals from the bed.

TIME SEQUENCE

| Time, min | 0 | 2 | 4 | 6 | 8 | 10 |
|---|---|---|---|---|---|---|
| Bed 34 | A-1 | A-2 | A-2 | DP-1 | DP-2 | |
| Bed 36 | A-2 | A-2 | DP-1 | DP-2 | A-1 | |
| Bed 38 | A-2 | DP-1 | DP-2 | A-1 | A-2 | |
| Bed 40 | DP-1 | DP-2 | A-1 | A-2 | A-2 | |
| Bed 42 | DP-2 | A-1 | A-2 | A-2 | DP-1 | |

As a bed is cycled at the 700° F. operating temperature, a carbonaceous deposit gradually accumulates. This deposit reduces the capacity of the adsorbent, which results in a breakthrough of normal paraffins into the isomer product stream and decreased normal paraffin recovery. The rate at which this deposit accumulates depends on factors such as temperature, feed impurities, feed properties, cycle time, and residual paraffin loadings. This type of adsorbent deactivation is temporary so that original bed capacity can be restored by burning off this deposit under controlled conditions.

Oxidative regeneration is a blocked operation with burnoff of the five adsorbent beds in sequence, and is required to maintain the working capacity of the molecular sieve. The basis for this procedure is a three-day shutdown consisting of the following stages:

Stage: Time, hrs.
(1) System preparation for regeneration _____ 2
(2) Oxidative regeneration _____ 68
(3) System preparation for adsorption step ____ 2

Total time _____ 72

When the beds have been cycled to the point that oxidative regeneration is required, the normal process cycle is shut down, and the beds undergo an additional long desorption purge to remove as much of the residual normal paraffins as possible. Countercurrent circulation of nitrogen is established by means of the purge gas compressor 60 at 100 p.s.i.a. and 750° F. The circulation of the hot nitrogen has two purposes, namely to sweep the purge gas from the bed if it is combustible (i.e., fuel gas, hydrogen, etc.), and to raise the temperature of the bed to above the coke ignition point prior to introduction of oxygen into the system. The effluent gas from the beds manifold 76 is cooled to condense the hydrocarbons and water that are desorbed. When the bed is up to temperature, air is introduced into the circulating stream at a rate such that the oxygen content of the gas entering the bed is between 0 and 1% by volume. The oxygen in the gas combusts with coke in the top of the bed. The heat released from combustion is carried out of the burning zone as a preheat front traveling ahead of the burning front. This preheat front raises the bed temperature to about 950° F. This temperature is controlled by regulating the amount of oxygen in the entering gas. Internal pellet temperatures in excess of 1300° F. will permanently destroy the molecular sieve crystal so the gas phase temperature is held to a maximum of 1000° F. As the burning front passes through the bed, the temperature will drop back to the gas inlet temperature of 750° F. Since the coke deposit contains hydrogen, water is formed during combustion in addition to carbon oxides. This water must be removed from the system because the molecular sieve is permanently damaged by repeated exposure to water at high temperatures. A refrigeration unit is used to remove most of the water, thereby minimizing this damage.

After the regeneration is complete, the beds are cooled down to the process operating temperature and purged of any remaining oxygen by circulating nitrogen. The beds are now ready to go on stream in the normal process cycle.

What is claimed is:

1. Process for separating normal paraffins from admixture with non-normal hydrocarbons which comprises passing the mixture in the vapor phase at super-atmospheric pressure through a fixed bed of a zeolitic molecular sieve adsorbent having an effective pore diameter of substantially 5 angstroms until the stoichiometric point of the adsorbing normals mass transfer zone has passed between about 85 and 97 percent of the length of the bed, thereafter isothermally and isobarically passing countercurrently through the bed a quantity of non-sorbable purge gas sufficient to remove the bed void space vapors, but not more than that which produces about 20 mole-percent feed normals in the bed effluent, and thereafter countercurrently continuing the flow of non-sorbable purge gas through the bed at substantially the same temperature and pressure to desorb at least a major portion of the normal paraffins from the adsorbent and flush same from the bed for recovery.

2. Process according to claim 1 wherein the non-sorbable purge gas is one or a mixture of two or more gases selected from the group consisting of nitrogen, hydrogen and methane.

3. Process according to claim 1 wherein the zeolitic molecular sieve is calcium zeolite A.

4. Process according to claim 3 wherein the quantity of non-sorbable purge gas employed is sufficient to remove the void space vapors but less than that which produces about 10 mole percent feed normals in the bed effluent.

5. Process according to claim 4 wherein the hydrocarbons comprising the mixture of normal paraffins and non-normal hydrocarbons contain from 4 to 13 carbon atoms and the mixture is substantially free of olefinically and acetylenically unsaturated hydrocarbons.

6. Process according to claim 5 wherein the pressure in the adsorption bed is at least 20 p.s.i.a. and the temperature is from 350° F. to 750° F.

References Cited
UNITED STATES PATENTS

| | | | |
|---|---|---|---|
| 3,201,490 | 8/1965 | Lacey et al. | 208—310 |
| 3,251,765 | 5/1966 | Mowll | 208—310 |
| 3,260,667 | 7/1966 | Yeo et al. | 208—310 |
| 3,342,726 | 9/1967 | Mowll et al. | 208—310 |
| 3,268,440 | 8/1966 | Griesmer et al. | 208—310 |
| 2,920,038 | 1/1960 | Feldbauer et al. | 208—310 |

HERBERT LEVINE, Primary Examiner

U.S. Cl. X.R.

260—676 MS